Patented Sept. 30, 1952

2,612,506

UNITED STATES PATENT OFFICE 2,612,506

THIOCYANATES OF 2-VINYLTHIOPHENES

William S. Emerson and Tracy M. Patrick, Jr., Dayton, Ohio, assignors to Monsanto Chemical Company, St. Louis, Mo., a corporation of Delaware No Drawing. Application July 1, 1947, Serial No. 758,474

7 Claims. (Cl. 260—329)

The present invention relates to a new class of compounds, namely thiocyanates of 2-vinylthiophenes.

The new compounds of this invention possess the structure.

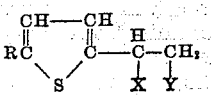

where R represents halogen or hydrogen and X and Y represent thiocyanate or isothiocyanate groups. When R is halogen, it is intended to include either fluorine, chlorine, bromine or iodine.

The above new compounds may be prepared by reacting 2-vinylthiophenes with thiocyanogen in an inert anhydrous non-polar organic solvent. However, the method for producing styrene dithiocyanate described in U. S. Patent 1,790,097 to Kaufmann is not generally applicable to the vinylthiophenes. Treatment of 2-vinylthiophene with bromine and an alkali metal thiocyanate in glacial acetic acid produced a product which gave negative tests for both the thiocyanate or isothiocyanate groups. The 5-chloro-2-vinylthiophene produced only a small yield of the dithiocyanate, the principal product being a compound which gave no test for either the thiocyanate or the isothiocyanate groups. On the other hand, 5-bromo-2-vinylthiophene dithiocyanate may be prepared in this manner although a higher yield was obtained by reacting 5-bromo-2-vinylthiophene with thiocyanogen in an inert anhydrous non-polar solvent. As suitable non-polar solvents mention may be made of benzene, toluene, xylene, carbon tetrachloride, ethyl ether, butyl ether, petroleum fractions such as ligroin, chlorinated petroleum fractions and equivalents and analogues thereof.

The following examples are specific embodiments of the invention and are to be taken as illustrative, not limitative thereof.

EXAMPLE I

2-vinylthiophene dithiocyanate

A solution of thiocyanogen in dry benzene was prepared by treating an ice cold suspension of 194 grams of lead thiocyanate in 300 cc. of benzene with a cold solution of 80 grams of bromine in 300 cc. of benzine. The solid was separated by filtration and washed with 150 cc. of benzene. Fifty-five grams of 2-vinylthiophene was added to the filtrate and the solution was allowed to stand all day in the bright sunlight. It was then seeded and placed in an ice box overnight. The first crop of crystals was separated by filtration and the filtrate was evaporated under reduced pressure at room temperature to a thick syrup. Additional product was filtered from this syrup. The total yield of crude 2-vinylthiophene dithiocyanate was 64 grams (57%). An analytical sample was crystallized four times by dissolving in benzene and precipitating with hexane, M. P. 87° C.

Anal. Calculated for $C_8H_6N_2S_3$: N, 12.4 Found: N, 12.3.

This compound gave the blood red color characteristic of a positive test for the thiocyanate group when a small amount of the solid was boiled for three to five minutes with 10% aqueous sodium hydroxide, the mixture cooled, acidified with dilute sulfuric acid and a small amount of 1% ferric chloride added (Wood, "Organic Reactions," John Wiley and Sons, Inc., New York, 1946, vol. III, p. 254). It gave a negative test for the presence of isothiocyanate (Mulliken, "Identification of Pure Organic Compounds," John Wiley and Sons, Inc., New York, 1922, vol. IV, p. 18). This test is carried out by shaking a small amount of the solid with aqueous ammoniacal silver nitrate, heating if necessary. A black precipitate, which was not obtained with vinylthiophene dithiocyanate, constitutes a positive test.

EXAMPLE II

5-chloro-2-vinylthiophene dithiocyanate

This compound was prepared by the procedure described in Example I. 50.6 grams of 5-chloro-2-vinylthiophene was added to a solution of thiocyanogen in dry benzene made from 125 grams of lead thiocyanate in 250 cc. of anhydrous benzene and 56 grams of bromine in 300 cc. of anhydrous benzene. The initial precipitate and that obtained by diluting the filtrate with hexane weighed 47.5 grams, M. P. 97–98° C., and constituted a 52% yield of 5-chloro-2-vinylthiophene dithiocyanate. An analytical sample melted at 99° C. after two crystallizations from benzene-hexane.

Anal. Calculated for $C_8H_5N_2S_3Cl$: C, 36.9; H, 1.93. Found: C, 36.8; H, 1.89.

5-chloro-2-vinylthiophene dithiocyanate gave a positive test for thiocyanate and a negative test for isothiocyanate.

The 5-fluoro-2-vinylthiophene dithiocyanate may be prepared by a similar procedure.

EXAMPLE III

5-chloro-2-(α-isothiocyano-β-thiocyanoethyl)thiophene

The filtrate from Example II obtained by diluting the benzene solution with hexane and filtering off the second crop of 5-chloro-2-vinylthiophene dithiocyanate was evaporated to dryness. The white crystalline solid was washed with ethanol and dried, yielding 35.8 grams of product. After recrystallization from benzene-hexane and then from hexane the M. P. was 65° C. This compound gave a positive test for both thiocyanate and isothiocyanate and represented a 39% yield of 5-chloro-2-(α-isothiocyano-β-thiocyanoethyl) thiophene.

Anal. Calculated for $C_8H_5N_2S_3Cl$: C, 36.9; H, 1.93; N, 10.74. Found: C, 37.3; H, 2.10; N, 10.69.

EXAMPLE IV

*5-bromo-2-vinylthiophene dithiocyanate*

A solution of thiocyanogen was prepared by adding slowly with shaking a cooled solution of 4.0 g. of bromine in 25 ml. of dry benzene to a cooled suspension of 9.7 g. of lead thiocyanate in 25 ml. of dry benzene. The resulting slurry was filtered and the residue was washed twice with 10 ml. portions of dry benzene. The washings were combined with the filtrate. To this cold benzene solution of thiocyanogen there was added with shaking 4.7 g. of 5-bromo-2-vinylthiophene. The flask was stoppered and allowed to stand in direct sunlight for twenty minutes. The flask was then placed in a refrigerator and allowed to stand overnight. Some tan crystals had formed on the bottom of the flask. These were removed by filtration and dried. The crude 5-bromo-2-vinylthiophene dithiocyanate weighed 0.9 g. and melted at 92–94° C. (cor.).

The benzene was allowed to evaporate from the filtrate. The residual brown solid was treated with 30 ml. of a cold mixture of equal parts hexane and benzene, and this slurry was filtered. The residue was washed with hexane and dried. This additional crude 5-bromo-2-vinylthiophene dithiocyanate weighed 2.9 g. and melted at 89–91° C. (cor.). The total crude yield was 50%. Upon treating with Norit (a form of active carbon) during recrystallization from benzene and hexane, white crystals of pure product were obtained with a M. P. of 96° C. (cor.).

Anal. Calculated for $C_8H_5N_2S_3Br$: C, 31.5; H, 1.65. Found: C, 31.8; H, 1.94.

The identical product was prepared by carrying out the reaction in glacial acetic acid but the yield was materially lower.

The 5-iodo-2-vinylthiophene dithiocyanate may be prepared by a procedure similar to that described in the foregoing example.

The thiocyanates of this invention are useful as insecticides and for other purposes.

The present invention is limited solely by the claims attached hereto as part of the present specification.

What is claimed is:

1. A compound of the structure

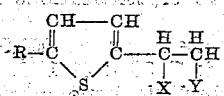

where R is a material of the group consisting of hydrogen, chlorine, fluorine, bromine and iodine, X is selected from the group consisting of thiocyano and isothiocyano radicals and Y is a thiocyano radical.

2. A compound of the structure

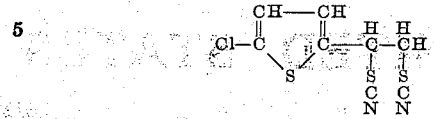

3. A compound of the structure

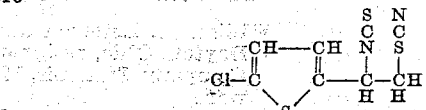

4. A compound of the structure

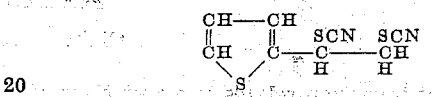

5. The method which comprises reacting thiocyanogen in an anhydrous non-polar solvent with a material selected from the group consisting of 2-vinylthiophene and 5-halo-2-vinyl-thiophene.

6. The method which comprises reacting thiocyanogen in an anhydrous non-polar solvent with 2-vinylthiophene.

7. The method which comprises reacting thiocyanogen in an anhydrous non-polar solvent with 5-chloro-2-vinylthiophene.

WILLIAM S. EMERSON.
TRACY M. PATRICK, Jr.

REFERENCES CITED

The following references are of record in the file of this patent:

UNITED STATES PATENTS

| Number | Name | Date |
| --- | --- | --- |
| 1,765,678 | Kaufmann | June 24, 1930 |
| 1,790,097 | Kaufmann | Jan. 27, 1931 |
| 2,135,987 | Murphy | Nov. 8, 1938 |
| 2,228,040 | Voogt | Jan. 7, 1941 |

OTHER REFERENCES

Richter: Organic Chemistry, pp. 649, 650, Wiley, N. Y.

Alles: J. Pharm. Exp. Ther. 72, 265 (1941).

Lands: Proc. Soc. Exp. Bio. Med. 57, 55–56 (1949).

Powers: Advancing Fronts in Chemistry, vol. II, p. 33, Reinhold Pub. Co., N. Y., 1946.

Caesar and Sachanen: Ind. Eng. Chem. 40, 922 (1948).

Steinkopf: Sie Chemie des Thiophens, p. 21, Edwards Lithoprint of 1941 publication.

Viaud: Produits Pharmaceutiques, 2, 58, Feb. 1947.

Whitmore: "Organic Chemistry," p. 543, Van Nostrand, N. Y., 1937.

Bernthsen and Sudborough: "Organic Chemistry," Van Nostrand, N. Y., 1925 (1922 edition), p. 549.

Dermer: J. Am. Chem. Soc. 61, 750 (1939).

Naylor: J. Am. Chem. Soc. (London), p. 247 (1945).

Williams: "Detoxication Mechanisms," pp. 194, 197, 198, Wiley, N. J., 1947.